Feb. 13, 1968 U. CAPRA 3,368,572
CAR WASHING APPARATUS
Filed Feb. 1, 1966 4 Sheets-Sheet 2

INVENTOR
UBERTO CAPRA
BY
ATTORNEYS

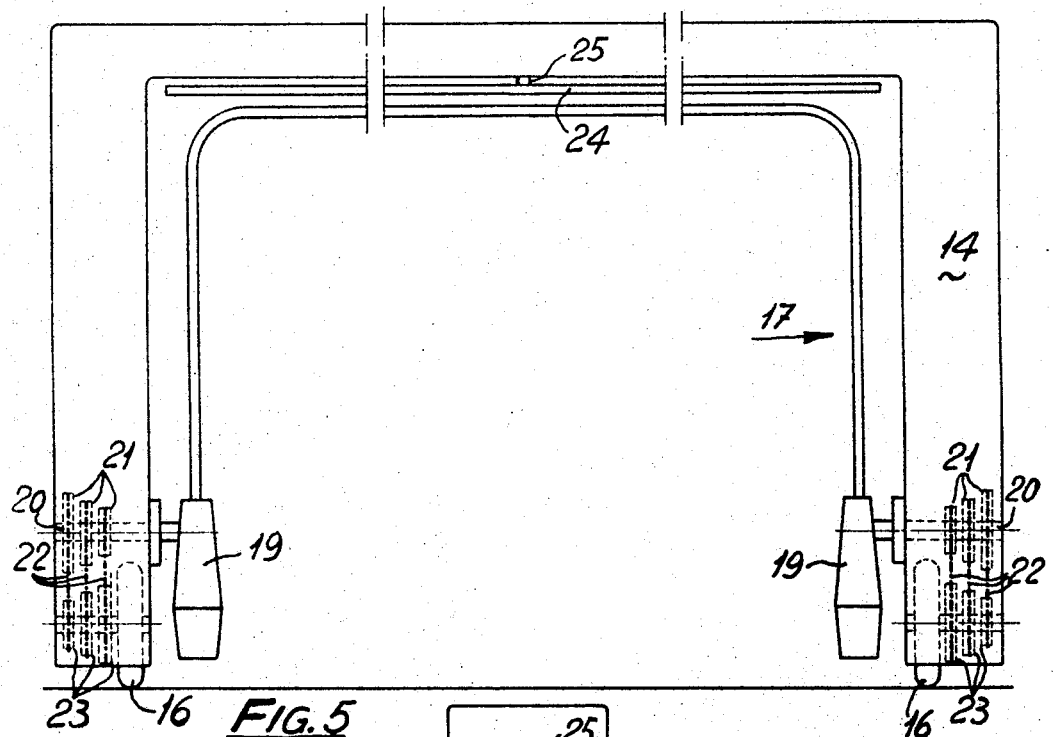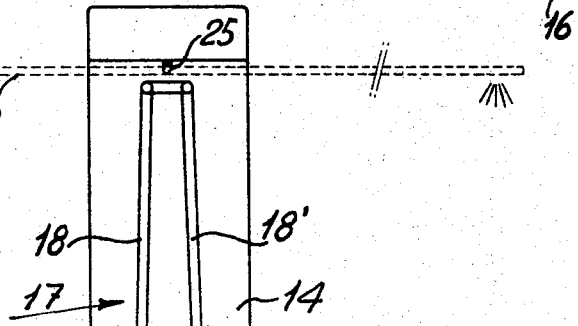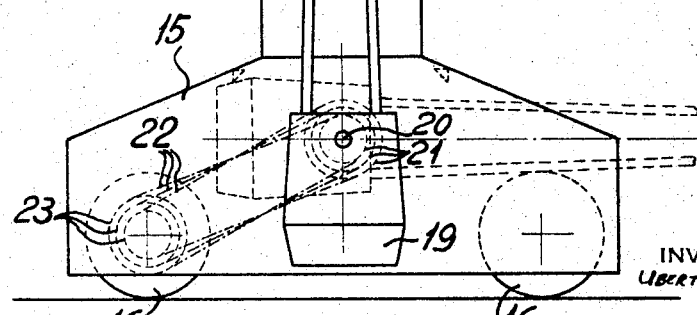

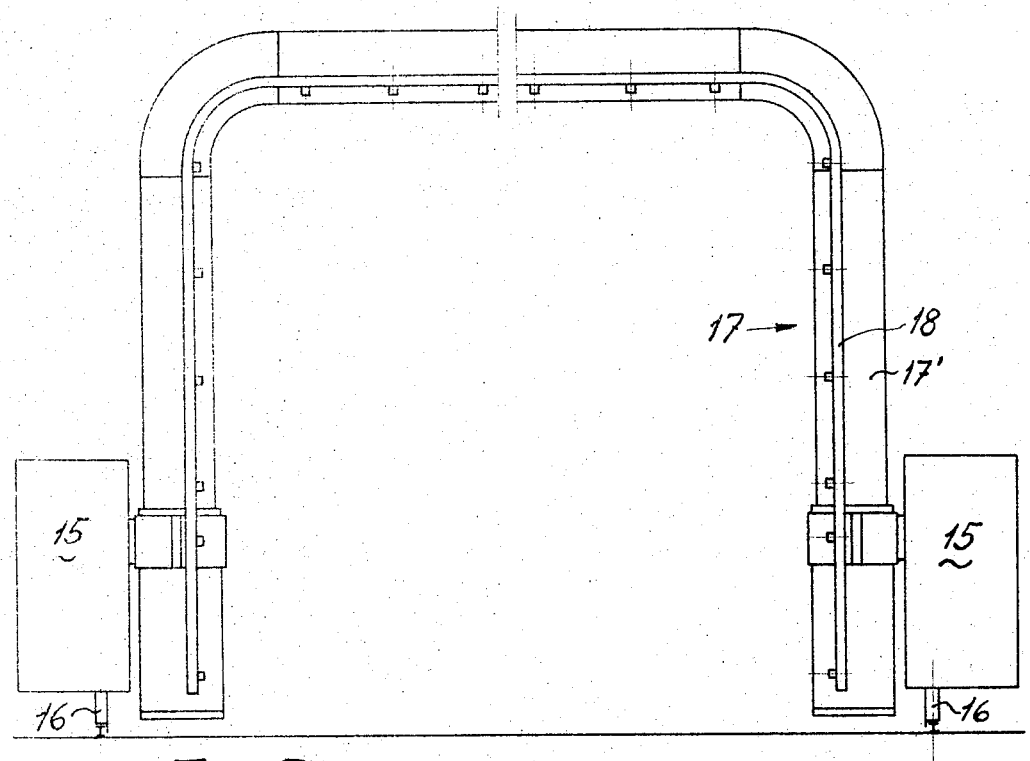
FIG. 7
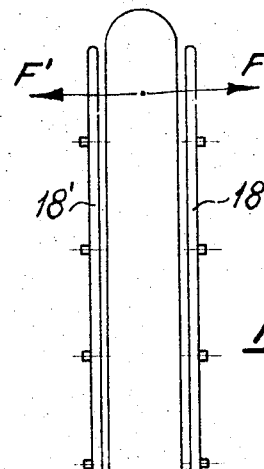
Fig. 8
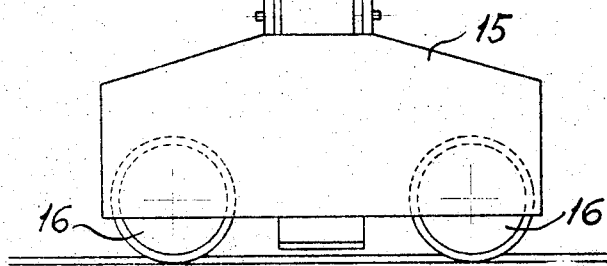

United States Patent Office 3,368,572
Patented Feb. 13, 1968

3,368,572
CAR WASHING APPARATUS
Uberto Capra, Vicenza, Italy, assignor to Ceccato & C. S.p.A., Alte Ceccato, Vicenza, Italy
Filed Feb. 1, 1966, Ser. No. 524,036
Claims priority, application Italy, Feb. 18, 1965, 3,405/65; May 29, 1965, 12,037/65
8 Claims. (Cl. 134—123)

This invention relates to apparatus for washing motor cars and other vehicles and, more particularly, to an improved apparatus of the type having a reduced height while still being capable of handling vehicles of extra length, and of simple and light weight construction.

It is known to provide a vehicle washing installation including a pivotally mounted arch-type framework which may be swung about an axis extending transversely of the vehicle. Installations of this type, as previously used, have been very expensive due to the various automatic devices required. Moreover, they are generally mounted in a fixed position and thus are not also suitable to meet the requirements of washing vehicles in small plants.

In particular, hitherto used installations have required an arch framework of considerable height due to the fact that the framework must be sufficiently high to span vehicles of any length. Aside from the relatively large necessary dimensions, there arises the necessity of suitably regulating the force of the water jets, detergents and air in accordance with the length of the vehicle to be washed. This is necessary in order to ensure that the jets will impact the different parts of the vehicle body with substantially the same force.

An object of the present invention is to provide a car washing apparatus of the type including a pivotal arch framework and in which the height of the arch is substantially reduced as compared to known installations of this type.

Another object of the invention is to provide a car washing apparatus including a pivoted frame of simple and light weight construction and capable of washing cars of any length.

A further object of the present invention is to provide a car washing apparatus of the type involving a pivotal arch framework and in which the arch, carrying the discharge nozzle means, is pivotally mounted on a pair of wheels or the like.

Yet another object of the invention is to provide a car washing apparatus of the type mentioned in which the nozzle carrying members are counter balanced and arranged to swing freely in a circular arc relative to the pivot point of the arch, and in a cycloidal arc after locking of the framework to the wheels and responsive to rotation of the wheels.

Yet a further object of the invention is to provide a car washing apparatus of the type mentioned and which can be moved without pivoting to a selected position and then swung in a circular or cycloidal arc, thereby adapting it to washing extra length vehicles.

Another object of the invention is to provide a car washing apparatus comprising a framework mounted on a pair of wheeled carriages with at least one nozzle carrying member swiveling with reference to the framework and including means for variable ratio selective coupling of at least one wheel to the nozzle carrying element whereby to effect swiveling of the nozzle carrying element during the motion of the carriage so that the nozzle carrying element will move through a cycloidal arc of varying amplitude depending on the selected ratio, and whereby, when the carriage is stationary, the nozzle carrying member may move through a circular arc.

Still a further object of the invention is to provide a car washing apparatus of the type just mentioned in which the nozzle carrying member advantageously comprises two curved pipes or ducts which are separate from each other but which are arranged laterally adjacent each other, and each equipped with a number of jet nozzles suitably disposed so as to allow the swiveling of the member in a circular arc by the reaction of the jets.

Still another object of the invention is to provide a car washing apparatus of the type just mentioned including control means to feed water into either one of the two pipes or ducts, with this control means further acting on the driving means for the carriages so as to reverse the direction of the latter when the nozzle carrying member, swinging in a cycloidal arc, reaches the end of its travel.

For an understanding of the principles of the invention, reference is made to the following description of typical embodiments thereof as illustrated in the accompanying drawings.

In the drawings:

FIG. 5 is a somewhat diagrammatic end elevation view of another embodiment of apparatus in accordance with the invention;

FIG. 6 is a somewhat diagrammatic side elevation view of the apparatus shown in FIG. 5;

FIG. 7 is a somewhat diagrammatic end elevation view of still another form of car washing apparatus embodying the invention; and FIG. 8 is a somewhat diagrammatic side elevation view of the apparatus shown in FIG. 7.

Figure 1:
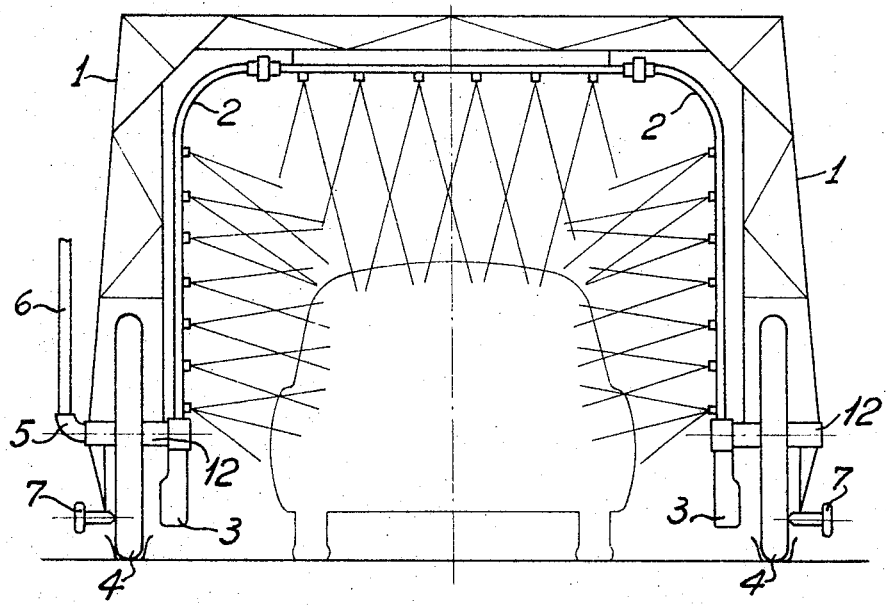
FIG. 1 is a somewhat diagrammatic front elevation view of one embodiment of car washing apparatus in accordance with the invention.
Figure 2:
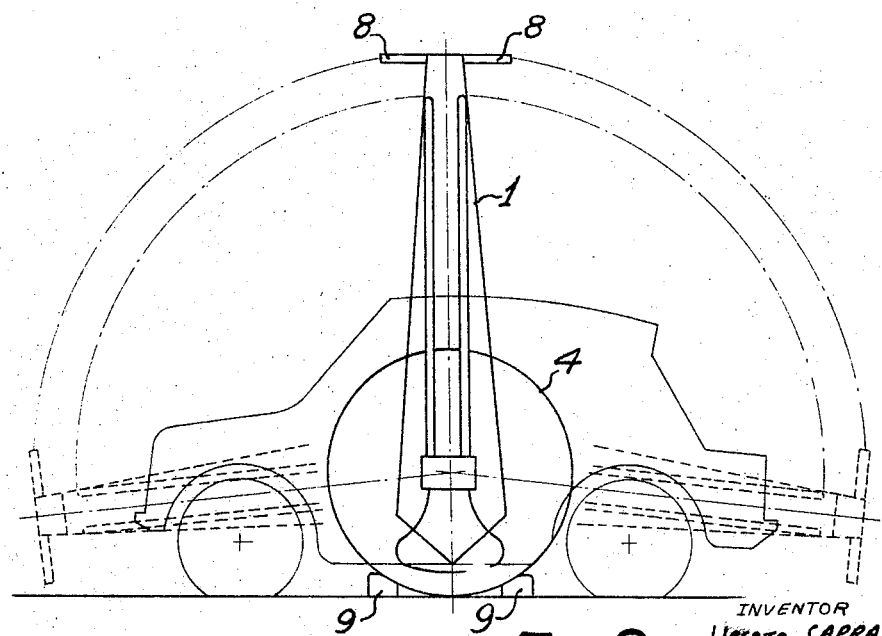
FIG. 2 is a somewhat diagrammatic side elevation view of the apparatus shown in FIG. 1, with the framework being shown in full lines in its vertical position and in broken lines in either of a pair of end positions assumed when the framework is pivoted in a circular arc.
Figure 3:
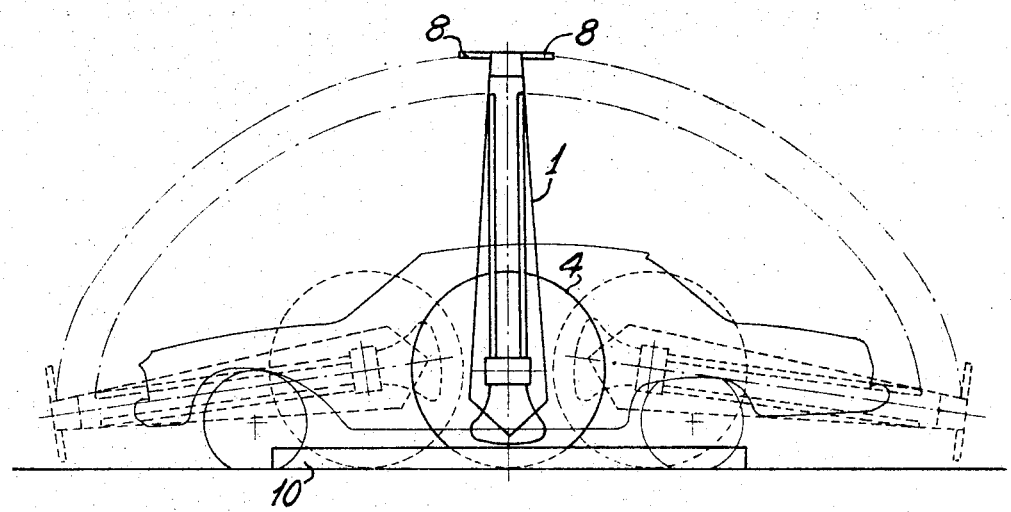
FIG. 3 is a view similar to FIG. 1 but with the broken line end positions being those positions assumed when the framework is pivoted in a cycloidal arc.

Referring first to the embodiment of the invention shown in FIGS. 1 through 4, the car washing apparatus illustrated therein includes a framework 1 which is a generally inverted rectangular U-shaped framework or arch including a pair of legs interconnected by a cross member. Framework 1 carries pipes 2 for supplying water, soap, detergent solutions or air to discharge nozzle means formed in the pipe 2. The framework 1 includes counter weights 3 and is mounted for pivoting on tubular hinge pins 12 which rotate in bushings fitted in the hubs of wheels 4. Wheels 4 may be replaced by sectors of wheels in cases where there is to be translatory motion of only a limited nature.

Tubular hinge pins 12 communicate with pipes 2 and are connected by multiple swivel connections 5 with flexible pipes 6 for the purpose of supplying wash water, soap, detergent solutions, or air to the pipes 2.

Framework 1 is further provided with locking means 7 whereby it may be selectively locked to wheels 4 for rotation with the wheels. Servo-control valves 8 are arranged on the upper portion or cross member of the framework 1 for actuation by contact with the ground or other support surface at each end of each swinging movement of framework 1, and which operate in such a manner as to vary the opening of the nozzles in accordance with the direction of swing of the framework.

To wash relatively short vehicles, such as compacts and the like, framework 1 is rolled into the working position on wheels 4. When the framework is in position and the connections have been made between flexible pipes 6 and connections 5, wheels 4 are blocked by means of small chocks, or blocks, or the like 9, and washing is started. By means of the reaction force of the water jets, which may be suitably inclined relatively to each other, or by servo-driving means which have not been shown, framework 1 is caused to swing about hinge pins 12 so as to trace a circular arc sufficiently large to pass around the whole vehicle between the end positions shown in broken lines in FIG. 2. At the end of each wing, valves 8 strike the ground thus varying the aperture of the nozzles for a maximum utilization of the jets during the next swing. In cases where the swing of the gantry or framework is produced by the reaction force of the jet nozzles, valves 8 effect a reversal of the direction of swing.

In order to wash longer vehicles, such as those whose length is greater than twice the inside height of framework 1, the wheels 4 are positioned on guides or tracks 10 extending parallel to the vehicle. Framework 1 is then locked to wheels 4 by actuating the locking devices 7, and washing is initiated. The swinging of the framework due to the reaction of the water jets, or by other suitable driving means, also causes rotation of wheels 4. Consequently, framework 1, during its swinging movement, will describe a cycloidal arc enclosing the entire vehicle even though the framework 1 itself is of relatively limited height.

Figure 4:
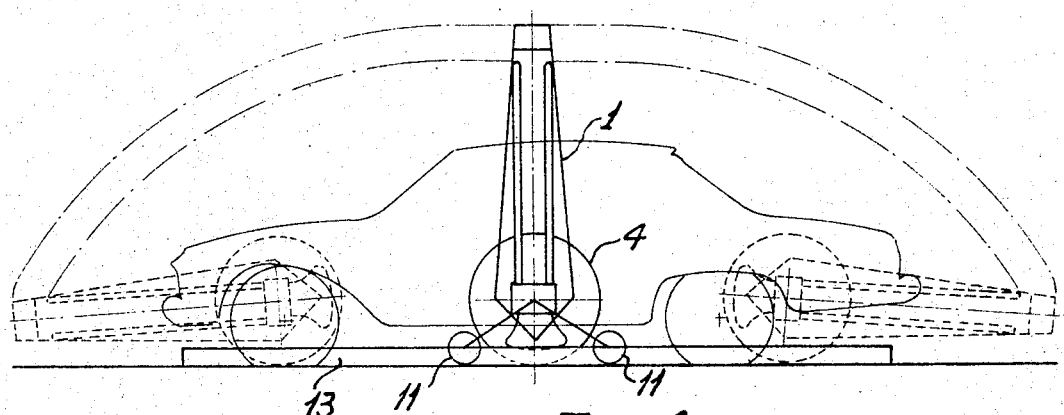
FIG. 4 is a somewhat diagrammatic side elevation view of the apparatus of FIG. 1 as used in washing extra long vehicles.

To wash exceptionally long vehicles, as illustrated in FIG. 4, framework 1 is brought into position on guides 13 arranged to extend parallel to the vehicle. The wheels 4 are guided by small carriages provided with wheels 11 traveling in the guides 13, and wheels 4 are rotated an amount sufficient to provide the desired translation movement of the framework parallel to itself. At the end of the translation movement, framework 1 is caused to swing about hinge pins 12 so as to describe the desired circular arc. Alternatively, the framework can be locked to wheels 4 by means of locking devices 7, and the wheels 4 then rotated in such a manner as to cause the framework 1 to describe a cycloidal arc. The hot or cold air required for drying and supplied through ducts fitted to framework 1 can be delivered by fans (not shown) arranged on the framework in place of the counter weights 3.

Referring now to the embodiment of the invention shown in FIGS. 5 and 6, generally inverted rectangular U-shaped framework 14 is mounted on a pair of small trucks 15 supported on wheels 16. A swiveling nozzle-carrying member 17 is formed of two separate pipes or ducts 18, 18' arranged laterally adjacent each other to form an arch having a span somewhat less than the span of the arch formed by framework 14. Member 17 is pivotally supported on tubular pivots 20 mounted in carriages 15, and is suitably balanced by counter weights 19.

Each tubular shaft has three or more chain sprockets 21 connected by chains 22 to sprockets 23. The sprockets 21 have progressively increasing diameters in a stepwise manner and the sprockets 23 have progressively decreasing diameters in a stepwise manner, as best seen in FIG. 5. Sprockets 23 may be selectively keyed to the shaft of traction wheel 16 to change the transmission ratios. All the sprocket wheels 23 can be disconnected so as to be idle when it is desired to swing framework 17 in a circular arc with carriages 15 remaining stationary. Suitable control means are provided to select the desired ratio of connection between sprockets 21 and 23.

The wash water, soap solution, detergent, or the like is supplied to nozzle carrying member 17 through suitable unions mounted on the apparatus itself, while the distribution of the liquids to the ducts 18 and 18' is effected by means of a suitable distributor unit fitted in one of the counter weights 19 or in one of the pivots 20. The supply of wash water or the like to one or the other of the ducts 18 or 18' will be selected in accordance with the direction of swiveling of member 17.

When it is desired to distribute the soap solution independently of the wash water, the apparatus can be provided with a separate fluid circuit supplying the soap solution to an arm or longitudinally extending pipe 24 pivoted at 25 on the horizontal member of framework 14. This arm or pipe can be connected to the actual source of the soap solution by means of flexible pipes which have not been illustrated. Pipe 24 can be rotated to a longitudinal position in such a manner as to produce the most favorable distribution of the soap solution, and then swung back parallel to framework 14 on completion of the operation.

The embodiment of the invention shown in FIGS. 7 and 8 differs from that shown in FIGS. 5 and 6 chiefly in that a separate carrying framework 14 is not provided. Referring to FIGS. 7 and 8, the generally inverted U-shape nozzle carrying member 17 is formed by a rigid pipe or the like 17' on which are mounted the two ducts 18 and 18'. The function of the pipe or other members 17' is to keep the carriages 15 rigidly connected to each other and also to support the ducts 18 and 18'. In the same manner as in the embodiment of FIGS. 5 and 6, member 17 is pivotal on pivots 20 mounted on carriage 15 and is suitably balanced by counter weights housed in the ends of the pipes 17'. Suitable flexible pipes or hoses are provided to distribute the soap solution, detergent, or the like when these are fed directly through ducts 18 and 18'.

Assuming that it is desired to wash a vehicle whose total length is less than twice the inside height of framework 17, the vehicle is brought under the arch framework 14 with its nozzle carrier 17, or beneath the tubes 18, 18' and the nozzle carrier 17', to spray the vehicle with soap solution to start a washing process. The water from the exterior connections passes into the distributor and is fed, for example, into duct 18 from which it is discharged through suitably directed nozzles arranged on this duct. The reaction force causes the nozzle carrier 17 to swing in the direction of the arrow F (FIGS. 6 and 8). At this time, the carrier 17 is free from driving connection with the wheels 16 of carriage 15, so that it can swing in a circular arc sufficiently large to enclose the entire vehicle. When carrier 17 reaches the end position, such as shown in broken lines in FIG. 6, a suitable element engages a stop on one of the carriers 15 and causes a distributor unit to switch over in a manner such as to direct the water into the other duct 18' to reverse the direction of swing of the carrier 17 so that it will swing in the direction of the arrow F'. This sequence of operation continues until the washing of the vehicle is completed, after which the compressed air for drying is delivered to ducts 18 and 18', or drying is effected in some other suitable manner.

When it is desired to wash vehicles having a length more than twice the inside height of the nozzle carrier 17, it is necessary to cause the nozzle carrier to swing through a cycloidal arc whose amplitude will vary in accordance with the length of the vehicle to be washed. Accordingly, the particular chain drive will be selected at the desired transmission ratio and, after spreading soap solution on the vehicle, washing will be started as described above. The circular swinging of the nozzle carrier produced by the reaction of the water discharged through the nozzles, will cause a translatory movement of the mounting or of the carriages 15 only, in the case of the embodiment shown in FIGS. 7 and 8. This circular motion, through the chain drives, will cause the frame or nozzle carrier to move through a cycloidal arc of varying amplitude depending upon the particular transmission ratio selected between wheels 16 and sprockets 21. When carrier 17 has completed a full swing in one direction, the distributor unit is switched over, as described, and water is supplied to the other pipe.

In the case of particularly heavy structures driving means can be provided to drive the carriages 15. In this case, the work of the driving motor will be added to that performed by the reactive jets, and the reversing of the direction of the distributor unit will also operate a suitable switch for reversing the direction of rotation of the carriage driving means. Thereby, a simultaneous reversal of the direction of travel of carriages 15 and a reversal of the water supply from duct 18 to 18', and vice versa, will be effected.

While specific embodiments of the invention have been shown and described in detail to illustrate the application of the principles of the invention, it will be understood that the invention may be embodied otherwise without departing from such principles.

What is claimed is:

1. Apparatus for washing vehicles, such as motor cars, comprising, in combination, at least a pair of coaxial support wheels spaced axially a distance in excess of the overall width of a vehicle; a generally inverted U-shape framework including a pair of legs interconnected by a cross member; means pivotally supporting said legs, adjacent their laterally spaced free ends, on said support wheels for swinging of said frame about a substantially horizontal and transversely extending axis between a pair of opposed, substantially horizontal orientations through a substantially vertical orientation; discharge nozzle means on said framework; means supplying fluid to said nozzle means; means selectively operable to couple said framework to said wheels for swinging of said frame, responsive to rotation of said wheels, in a cycloidal arc; said selectively operable means being selectively operable to provide for the framework remaining in a vertical attitude during rotation of said support wheels; a pair of trucks each mounted on a pair of said support wheels; said framework being mounted on said pair of trucks for its swinging movement; and selectively engageable variable transmission ratio driving means for effectively coupling said framework to at least one wheel of one truck whereby, when said framework is coupled to one wheel and said trucks effect a translatory movement, said framework will be swung through a cycloidal arc having an amplitude corresponding to the selected transmission ratio and whereby, when said trucks are stationary, said framework may be swung through a circular arc.

2. Apparatus for washing vehicles, as claimed in claim 1, including a rigid inverted rectangular U-shape arch rigidly interconnecting said trucks.

3. Apparatus for washing vehicles, as claimed in claim 1, including at least two ducts extending in side-by-side relation along said framework, the discharge nozzle means extending from said ducts with one set of discharge nozzle means discharging in one direction relative to the swinging movement of said framework and the other set of discharge nozzle means discharging in the opposite direction relative to the swinging movement of said framework; each discharge nozzle means comprising plural nozzles; said framework being swung by the reaction of fluid discharged from said nozzles; and control means automatically operable to deliver fluid under pressure selectively into one of said ducts in accordance with the direction of swinging of said framework.

4. Apparatus for washing vehicles, as claimed in claim 3, in which said ducts are mounted on said framework.

5. Apparatus for washing vehicles, as claimed in claim 3, including driving means for said trucks; said control means automatically controlling the direction of operation of said driving means in accordance with the direction of swinging of said framework.

6. Apparatus for washing vehicles, as claimed in claim 5, in which said means controlling supply of fluid under pressure to said ducts comprise a piston element for effecting transfer of the fluid connections; the reversal of the connections being effected by engagement of said piston element with a stop on said trucks when an end position of said framework is reached.

7. Apparatus for washing vehicles, as claimed in claim 1, in which said means pivotally supporting said legs comprises bearing pivots freely rotatable in said trucks; said transmission means comprising chain drive means.

8. Apparatus for washing vehicles, as claimed in claim 7, including means controlling the supply of fluid under pressure to a selected one of a pair of ducts extending along said framework and each having discharge nozzle means with the discharge nozzle means being directed in respective opposite directions to effect swinging of said framework in opposed directions; said bearing pivot shafts operating said control means in accordance with the desired direction of swing of said framework.

References Cited

UNITED STATES PATENTS 2,708,446   5/1955   Phillips          134—123 XR

FOREIGN PATENTS 841,966   7/1960   Great Britain.
551,797   11/1956   Italy.

CHARLES A. WILLMUTH, *Primary Examiner.*

R. L. BLEUTGE, *Examiner.*